(12) United States Patent
Wang et al.

(10) Patent No.: US 12,068,673 B2
(45) Date of Patent: Aug. 20, 2024

(54) LOAD LINE CIRCUIT AND ELECTRONIC DEVICE

(71) Applicant: Huawei Technologies Co., Ltd., Guangdong (CN)

(72) Inventors: Xiaokun Wang, Shenzhen (CN); Zhongjian Chen, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 204 days.

(21) Appl. No.: 17/743,237

(22) Filed: May 12, 2022

(65) Prior Publication Data

US 2022/0271644 A1 Aug. 25, 2022

Related U.S. Application Data

(63) Continuation of application No. PCT/CN2020/104986, filed on Jul. 27, 2020.

(30) Foreign Application Priority Data

Nov. 14, 2019 (CN) .......................... 201911114288.4

(51) Int. Cl.
*H02M 1/00* (2007.01)
(52) U.S. Cl.
CPC ....... *H02M 1/0048* (2021.05); *H02M 1/0025* (2021.05)
(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081;

(Continued)

(56) References Cited

U.S. PATENT DOCUMENTS 9,543,834 B2 * 1/2017 Izumoto ................ H02M 3/156
9,577,508 B2 * 2/2017 Wang ..................... H02M 1/15
(Continued)

FOREIGN PATENT DOCUMENTS

CN 100380798 C 4/2008
CN 101236441 A 8/2008
(Continued)

*Primary Examiner* — Jeffrey A Gblende
(74) *Attorney, Agent, or Firm* — WOMBLE BOND DICKINSON (US) LLP

(57) ABSTRACT

This application provides a load line circuit and an electronic device, where the load line circuit is applied to the electronic device. A voltage value of a feedback voltage provided by the load line circuit to a switch-mode power supply is linearly and positively correlated with each of a voltage value of a first voltage and a current value of a first current, where the first voltage is a voltage provided to a load circuit, and the first current is a current provided to the load circuit. Through disposition of the load line circuit, the switch-mode power supply can implement a load line function.

17 Claims, 7 Drawing Sheets

(58) Field of Classification Search
CPC .......... H02M 5/293; H02M 7/12; H02M 3/10;
H02M 3/125; H02M 3/13; H02M 3/135;
H02M 3/145; H02M 3/15; H02M 3/155;
H02M 3/156; H02M 3/157; H02M 3/158;
H02M 1/346; H02M 3/1588; H02M
2003/1566; H02M 3/1582; H02M 3/1584;
H02M 2003/1557; H02M 1/0032; H02M
1/4225; H02M 7/217; H02M 1/0025;
H02M 1/0045; H02M 1/0009; H02M
1/08; H02M 1/088; H02M 1/0048; H05B
39/048; B23K 11/24; H04B 2215/069
See application file for complete search history.

(56) References Cited

U.S. PATENT DOCUMENTS

| | | | |
|---|---|---|---|
| 10,355,604 B2 * | 7/2019 | Wong | H02M 1/096 |
| 10,374,513 B2 * | 8/2019 | Yamada | H02M 1/4258 |
| 2004/0107370 A1 | 6/2004 | Mosley | |
| 2013/0043849 A1 | 2/2013 | Pagano | |
| 2014/0084887 A1 | 3/2014 | Sahu et al. | |
| 2019/0238054 A1 * | 8/2019 | Flaibani | H02M 3/158 |

FOREIGN PATENT DOCUMENTS

| | | |
|---|---|---|
| CN | 103227412 A | 7/2013 |
| CN | 103731033 A | 4/2014 |
| CN | 105406723 A | 3/2016 |
| CN | 108183610 A | 6/2018 |
| CN | 110413032 A | 11/2019 |
| CN | 111010021 A | 4/2020 |

* cited by examiner

LOAD LINE CIRCUIT AND ELECTRONIC DEVICE

CROSS-REFERENCE TO RELATED APPLICATIONS

This application is a continuation of International Application No. PCT/CN2020/104986, filed on Jul. 27 2020, which claims priority to Chinese Patent Application No. 201911114288.4, filed on Nov. 14, 2019. The disclosures of the aforementioned applications are hereby incorporated by reference in their entireties.

TECHNICAL FIELD

This application relates to the field of switch-mode power supply technologies, and in particular, to a load line circuit and an electronic device.

BACKGROUND

In an electronic device, a switch-mode power supply may provide a current for a system on chip (SoC). As functions of the SoC improve, a current required for the SoC operating in a high load scenario also increases. As a result, a problem of power consumption of the SoC becomes more serious accordingly.

To reduce power consumption of an SoC, some switch-mode power supplies with a load line function emerge at present. For example, a voltage regulator module (VRM) power supply is a switch-mode power supply with the load line function. For a switch-mode power supply with the load line function, an output voltage of the switch-mode power supply may linearly decrease when an output current of the switch-mode power supply increases. Therefore, when an SoC runs with a high load, the output current of the switch-mode power supply increases, and the output voltage of the switch-mode power supply decreases with the increase in the output current, thereby reducing power consumption of the SoC and limiting an increase in output power of the switch-mode power supply to reduce power consumption of the SoC.

However, only the type of switch-mode power supply with the load line function, such as the VRM power supply, can reduce power consumption of an SoC by using the load line function at present. Other conventional switch-mode power supplies without the load line function cannot reduce power consumption of an SoC by using the load line function. Therefore, application of the load line function in switch-mode power supplies still has a plurality of limitations.

SUMMARY

In view of this, this application provides a load line circuit and an electronic device. The load line circuit may be disposed in a feedback loop of a conventional switch-mode power supply, so that the conventional switch-mode power supply without a load line function can also implement the load line function, so as to help overcome a limitation of selecting a switch-mode power supply type.

According to a first aspect, embodiments of this application provides a load line circuit, including a first sampling circuit, a second sampling circuit, and a feedback circuit. An output terminal of the first sampling circuit is coupled to a first input terminal of the feedback circuit, an output terminal of the second sampling circuit is coupled to a second input terminal of the feedback circuit, and an output terminal of the feedback circuit is configured to be coupled to a switch-mode power supply. The first sampling circuit may generate a second voltage and provide the second voltage to the feedback circuit, where a voltage value of the second voltage is linearly and positively correlated with a voltage value of a first voltage, and the first voltage is a voltage provided by the switch-mode power supply to a load circuit. The second sampling circuit may generate a regulating voltage and provide the regulating voltage to the feedback circuit, where a voltage value of the regulating voltage is linearly and positively correlated with a current value of a first current, and the first current is a current provided by the switch-mode power supply to the load circuit. The feedback circuit may generate a feedback voltage based on the second voltage and the regulating voltage, and feed back the feedback voltage to the switch-mode power supply, where a voltage value of the feedback voltage is linearly and positively correlated with each of the voltage value of the second voltage and the voltage value of the regulating voltage.

In this embodiment of this application, the voltage value of the second voltage generated by the first sampling circuit is linearly and positively correlated with the voltage value of the first voltage, and the voltage value of the feedback voltage generated by the feedback circuit is in turn linearly and positively correlated with the voltage value of the second voltage. Therefore, the voltage value of the feedback voltage is linearly and positively correlated with the voltage value of the first voltage. The voltage value of the regulating voltage generated by the second sampling circuit is linearly and positively correlated with the current value of the first current, and the voltage value of the feedback voltage generated by the feedback circuit is in turn linearly and positively correlated with the voltage value of the regulating voltage. Therefore, the voltage value of the feedback voltage is linearly and positively correlated with the current value of the first current. In other words, the first current is linearly and negatively correlated with the first voltage. A switch-mode power supply without a load line function regulates an output voltage based on a feedback voltage, so that a feedback voltage received subsequently may approach a rated voltage. Therefore, when the first current increases, the first voltage linearly decreases accordingly. Generally, the first voltage provided by the switch-mode power supply to the load circuit may be equivalent to an output voltage of the switch-mode power supply, and the first current provided by the switch-mode power supply to the load circuit may be equivalent to an output current of the switch-mode power supply. Therefore, the load line circuit provided in this embodiment of this application can enable an output voltage of a conventional switch-mode power supply without the load line function to linearly decrease with an increase in an output current, that is, the conventional switch-mode power supply can also be enabled to implement the load line function.

In one embodiment, the first sampling circuit includes a resistor R1, a resistor R2, a resistor R3, a resistor R4, and a first differential amplifier, where one end of the resistor R1 is configured to be coupled to a negative input terminal of the load circuit, and the other end of the resistor R1 is coupled to a negative input terminal of the first differential amplifier; one end of the resistor R3 is coupled to the negative input terminal of the first differential amplifier, and the other end of the resistor R3 is coupled to an output terminal of the first differential amplifier; one end of the resistor R2 is configured to be coupled to the positive output terminal of the switch-mode power supply, and the other end of the resistor R2 is coupled to a positive input terminal of the first differential amplifier; and one end of the resistor R4 is coupled to the positive input terminal of the first differential amplifier, and the other end of the resistor R4 is coupled to a grounding circuit.

Specifically, the one end of the resistor R1 is coupled to the negative input terminal of the load circuit, and the one end of the resistor R2 is coupled to the positive input terminal of the load circuit. Therefore, the resistor R1 and the resistor R2 may detect the first voltage provided to the load circuit. Through proper setting of resistance values of the resistor R1, the resistor R2, the resistor R3, and the resistor R4, a voltage provided to the positive input terminal of the first differential amplifier and a voltage provided to the negative input terminal of the first differential amplifier may be set, so that the output terminal of the first differential amplifier may output the second voltage.

For example, the resistance value of the resistor R1 is the same as the resistance value of the resistor R2, and the resistance value of the resistor R3 is the same as the resistance value of the resistor R4. In this case, a ratio of the voltage value of the second voltage output by the first differential amplifier to the voltage value of the first voltage is equal to a ratio of the resistance value of the resistor R3 to the resistance value of the resistor R1.

For another example, the resistance value of the resistor R1, the resistance value of the resistor R2, the resistance value of the resistor R3, and the resistance value of the resistor R4 are the same. In this case, the voltage value of the second voltage output by the first differential amplifier is equal to the voltage value of the first voltage.

In one embodiment, the first sampling circuit may further include a first capacitor, and the first capacitor is connected to the resistor R3 in parallel. The first capacitor may integrate and filter a high frequency signal, in the first voltage, detected by the first sampling circuit, thereby reducing a high frequency noise in the feedback voltage, and further helping to improve stability of the switch-mode power supply.

In one embodiment, the first sampling circuit may further include a second capacitor, and the second capacitor is connected to the resistor R2 in parallel. Adding the second capacitor to the first sampling circuit helps to increase sampling bandwidth and a voltage gain of the first sampling circuit, and further helps to improve a detection speed of the first sampling circuit and accuracy of a detection result.

In one embodiment, the second sampling circuit includes a resistor R5, a resistor R6, a resistor R7, a resistor R8, and a second differential amplifier, where one end of the resistor R5 is configured to be coupled to a first terminal of a sampling resistor, the other end of the resistor R5 is coupled to a negative input terminal of the second differential amplifier, and the first terminal of the sampling resistor is coupled to th positive input terminal of the load circuit; one end of the resistor R6 is coupled to the negative input terminal of the second differential amplifier, and the other end of the resistor R6 is coupled to an output terminal of the second differential amplifier; one end of the resistor R7 is configured to be coupled to a second terminal of the sampling resistor, the other end of the resistor R7 is coupled to a positive input terminal of the second differential amplifier, and the second terminal of the sampling resistor is coupled to a positive output terminal of the switch-mode power supply; and one end of the resistor R8 is coupled to the positive input terminal of the second differential amplifier, and the other end of the resistor R8 is coupled to the grounding circuit.

In this embodiment of this application, the first terminal of the sampling resistor is coupled to the positive input terminal of the load circuit, the second terminal of the sampling resistor is coupled to the positive output terminal of the switch-mode power supply, and a current value of a sampled current flowing through the sampling resistor and the current value of the first current have a directly proportional relationship. Specifically, if the first current is transmitted between the switch-mode power supply and the load circuit through N transmission paths, and the sampling resistor is disposed in any of the N transmission paths, the current value of the sampled current is 1/N of the current value of the first current. If one end of the sampling resistor is coupled to the N transmission paths, and the other end is coupled to the positive input terminal of the load circuit, the current value of the sampled current is equal to the current value of the first current.

In the second sampling circuit provided in this embodiment of this application, the one end of the resistor R5 is coupled to the first terminal of the sampling resistor, and the one end of the resistor R7 is coupled to the second terminal of the sampling resistor. Therefore, the second sampling circuit may receive a voltage drop of the sampling resistor through the resistor R5 and the resistor R7. A voltage value of the voltage drop of the sampling resistor and the current value of the sampled current have a directly proportional relationship, and the current value of the sampled current and the current value of the first current also have a directly proportional relationship. Therefore, the second sampling circuit may generate the regulating voltage based on the voltage drop of the sampling resistor, and the voltage value of the regulating voltage is linearly and positively correlated with the current value of the first current. Specifically, through proper configuration of resistance values of the resistor R5, the resistor R6, the resistor R7, and the resistor R8, a voltage provided to the positive input terminal of the second differential amplifier and a voltage provided to the negative input terminal of the second differential amplifier may be set, so that the output terminal of the second differential amplifier may output a regulating voltage that is linearly and positively correlated with the voltage drop of the sampling resistor. Because the voltage value of the voltage drop of the sampling resistor and the current value of the sampled current have the directly proportional relationship, and the current value of the sampled current and the current value of the first current also have the directly proportional relationship, the voltage value of the regulating voltage is linearly and positively correlated with the current value of the first current.

For example, the resistance value of the resistor R5 is the same as the resistance value of the resistor R7, and the resistor R6 and the resistor R8 have a same resistance value. In this case, a ratio of the voltage value of the regulating voltage to the voltage value of the voltage drop of the sampling resistor is equal to a ratio of the resistance value of the resistor R6 to the resistance value of the resistor R5.

For another example, the second sampling circuit further includes a resistor R9 and a third capacitor. A first terminal of the resistor R9 is coupled to the resistor R7, and a second terminal of the resistor R9 is coupled to the positive input terminal of the second differential amplifier; and one end of the third capacitor is coupled to the first terminal of the resistor R9, and the other end of the third capacitor is grounded. The resistor R7 and the third capacitor may form a first-order filter circuit to filter out a high frequency noise signal from an input signal (that is, a voltage of the second terminal of the sampling resistor RT) of the second differential amplifier a second amplifier, thereby helping to improve accuracy of a sampling result of the second sampling circuit and enhance stability of the second sampling circuit.

In view of this, in one embodiment, a sum of a resistance value of the resistor R9 and the resistance value of the resistor R7 is the resistance value of the resistor R5, and the resistor R6 and the resistor R8 have the same resistance value. In this case, a ratio of the voltage value of the regulating voltage to the voltage value of the voltage drop of the sampling resistor is still equal to a ratio of the resistance value of the resistor R6 to the resistance value of the resistor R5.

For still another example, N transmission paths connected in parallel are included between the load circuit and the positive output terminal of the switch-mode power supply, the sampling resistor is located in any of the N transmission paths, and N is an integer greater than or equal to 1; and the resistance value of the resistor R6 is N times the resistance value of the resistor R5. In this case, the current value of the sampled current is 1/N of the current value of the first current, and the resistance value of the resistor R6 is N times the resistance value of the resistor R5. The voltage value of the regulating voltage may be enabled to be equal to the voltage value of the voltage drop of the sampling resistor.

In one embodiment, the feedback circuit may perform additive operational amplifying processing on the second voltage and the regulating voltage. Specifically, the feedback circuit may be an additive operational amplifying circuit, and the additive operational amplifying circuit may be a non-inverting additive circuit, or may be an inverting additive circuit.

For example, the feedback circuit includes a resistor R10, a resistor R11, a resistor R12, a resistor R13, a resistor R14, and a third differential amplifier, where one end of the resistor R11 is coupled to the output terminal of the first sampling circuit, the other end of the resistor R11 is coupled to each of one end of the resistor R12 and a positive input terminal of the third differential amplifier, and the other end of the resistor R12 is grounded; one end of the resistor R14 is coupled to the output terminal of the second sampling circuit, and the other end of the resistor R14 is coupled to the positive input terminal of the third differential amplifier; one end of the resistor R13 is grounded, and the other end of the resistor R13 is coupled to a negative input terminal of the third differential amplifier; and one end of the resistor R10 is coupled to the negative input terminal of the third differential amplifier, and the other end of the resistor R10 is coupled to an output terminal of the third differential amplifier.

The feedback circuit may receive, through the first input terminal, the second voltage provided by the first sampling circuit, and receive, through the second input terminal, the regulating voltage provided by the second sampling circuit. Through proper setting of resistance values of the resistor R10, the resistor R11, the resistor R12, the resistor R13, and the resistor R14, a voltage provided to the positive input terminal of the third differential amplifier and a voltage provided to the negative input terminal of the third differential amplifier may be set, so that the output terminal of the third differential amplifier may output the feedback voltage, and the voltage value of the feedback voltage is linearly and positively correlated with each of the voltage value of the second voltage and the voltage value of the regulating voltage.

In one embodiment, the feedback circuit may further include a fourth capacitor, one end of the fourth capacitor is coupled to the negative input terminal of the third differential amplifier, and the other end of the fourth capacitor is coupled to the output terminal of the third differential amplifier. The fourth capacitor may integrate and filter a high frequency signal in a voltage input to the third differential amplifier, thereby reducing the high frequency noise in the feedback voltage, and further helping to improve stability of the switch-mode power supply.

For example, the resistance value of the resistor R11, the resistance value of the resistor R12, and the resistance value of the resistor R14 are the same, and the resistance value of the resistor R10 is twice the resistance value of the resistor R13. In this case, the voltage value of the feedback voltage may be equal to a sum of the voltage value of the second voltage and the voltage value of the feedback voltage.

According to a second aspect, embodiments of this application provides an electronic device. The electronic device includes a switch-mode power supply, a load circuit, a sampling resistor, and the load line circuit provided in any possible implementation of the first aspect. A positive output terminal of the switch-mode power supply is coupled to a second terminal of the sampling resistor, a first terminal of the sampling resistor is coupled to a positive input terminal of the load circuit, and a negative output terminal of the switch-mode power supply is coupled to a negative input terminal of the load circuit; a first sampling circuit of the load line circuit is coupled to each of the positive input terminal of the load circuit and the negative input terminal of the load circuit, and a second sampling circuit of the load line circuit is coupled to each of the first terminal of the sampling resistor and the second terminal of the sampling resistor; and the switch-mode power supply may provide a first voltage and a first current to the load circuit by using the sampling resistor.

In the foregoing electronic device, the load line circuit is equivalent to being disposed in a feedback loop of the switch-mode power supply. The load line circuit provides a feedback voltage to the switch-mode power supply, so that the switch-mode power supply may regulate an output voltage of itself based on the feedback voltage. Processing logic of a switch-mode power supply without a load line function is to maintain a feedback voltage at a rated voltage. Therefore, when a first current increases and consequently the feedback voltage linearly increases accordingly, the switch-mode power supply reduces an output voltage, so that a feedback voltage received subsequently may return to the rated voltage, that is, the output voltage of the switch-mode power supply linearly decreases with an increase in an output current, thereby implementing the load line function.

In one embodiment, N transmission paths are included between the positive output terminal of the switch-mode power supply and the positive input terminal of the load circuit, the sampling resistor is located in any of the N transmission paths, and N is an integer greater than or equal to 1. Setting a plurality of transmission paths between a switch-mode power supply and a load circuit helps to reduce a transmission loss and increase maximum transmission power.

These aspects or other aspects of this application are more concise and comprehensible in descriptions of the following embodiments.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. It should be noted that in descriptions of this application, "at least one" means one or a plurality of, and "a plurality of" means two or more. In view of this, "a plurality of" may also be understood as "at least two" in embodiments of the present disclosure. "And/Or" describes an association relationship of associated objects and represents that three relationships may exist. For example, A and/or B may represent the following three cases: Only A exists, both A and B exist, and only B exists. In addition, the character "/" usually indicates an "or" relationship between associated objects unless otherwise specified. In addition, it should be understood that words such as "first" and "second" in the descriptions of this application are used merely for distinguishing in description, but shall not be understood as an indication or implication of relative importance, and shall not be understood as an indication or implication of a sequence.

It should be noted that "coupling" in this application means an energy transfer relationship. Specifically, energy may be electric energy. For example, "A is coupled to B" means that A and B may transfer electric energy to each other. In terms of an electrical connection relationship, "A is coupled to B" may be that A and B are electrically connected directly, or may be that A and B are electrically connected indirectly by using another conductor or electronic device, so that A and B may transfer voltage signals to each other.

In the embodiments of this application, "linearly and positively correlated" may be understood as that a variable linearly increases with an increase in another variable. For example, that y is linearly and positively correlated with x may be understood as that a value of y linearly increases with an increase in a value of x. "Linearly and negatively correlated" may be understood as that a variable linearly decreases with an increase in another variable. For example, that y is linearly and negatively correlated with x may be understood as that a value of y linearly decreases with an increase in a value of x. For example, in relational expressions such as y=ax+b and y=ax, when a is a negative value, y is linearly and negatively correlated with x, and when a is a positive value, y is linearly and positively correlated with x.

The following clearly describes the technical solutions in the embodiments of this application with reference to the accompanying drawings in the embodiments of this application.

Figure 1:
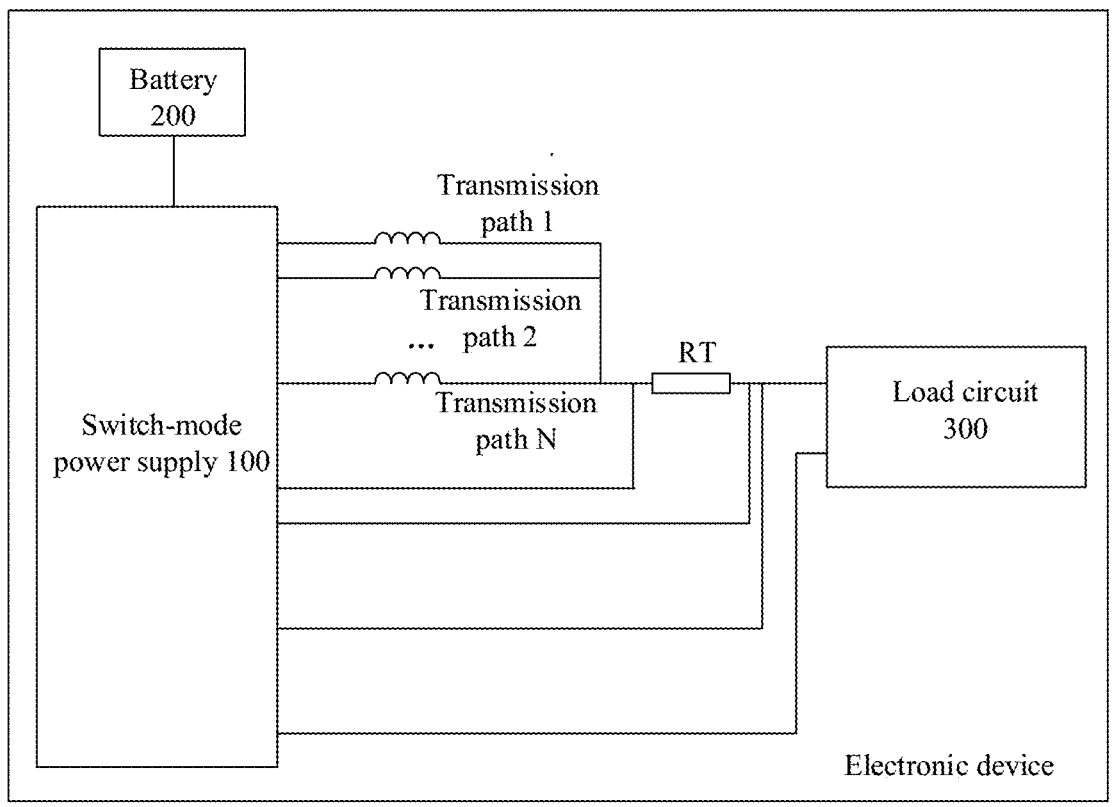
FIG. 1 is a schematic structural diagram of an electronic device.

FIG. 1 shows an example of a schematic structural diagram of an electronic device. The electronic device may be a smartphone, a tablet computer, a vehicle, smart glasses, or another electronic device in which a switch-mode power supply is disposed. In FIG. 1, the electronic device mainly includes a switch-mode power supply 100, a battery 200, and a load circuit 300. The load circuit 300 may be an SoC, a central processing unit (CPU), a peripheral chip, or the like of the electronic device. This is not limited in this embodiment of this application.

The switch-mode power supply 100 may receive electric energy from the battery 200, and provide the received electric energy to the load circuit 300. Specifically, as shown in FIG. 1, a positive output terminal of the switch-mode power supply 100 includes N ports, where N is an integer greater than or equal to 1. N ports at a positive output terminal of the switch-mode power supply 100 are coupled to one ends of N transmission paths on a one-to-one correspondence basis. The other ends of the N transmission paths are connected in parallel and coupled to a positive input terminal of the load circuit 300. A negative output terminal of the switch-mode power supply 100 is coupled to a negative input terminal of the load circuit 300. A loop is formed between the switch-mode power supply 100 and the load circuit 300, so that an output current of the switch-mode power supply 100 may be transmitted to the load circuit 300 over the N transmission paths. The output current of the switch-mode power supply 100 may be understood as a current output by the positive output terminal of the switch-mode power supply 100, that is, a sum of currents output by the N ports at the positive output terminal.

In this embodiment of this application, a current provided by the switch-mode power supply 100 to the load circuit 300 may be referred to as a first current. The first current may be understood as an input current of the load circuit 300. If no other load circuit exists, the first current may also be understood as the output current of the switch-mode power supply 100, or the first current may also be understood as a sum of currents transmitted over the N transmission paths. A current transmitted over each transmission path may also be referred to as a sub-current of the first current.

As shown in FIG. 1, each transmission path may include a filter inductor. A transmission path 1 is used as an example. One end of a filter inductor in the transmission path 1 is coupled to a positive output terminal that is of the switch-mode power supply 100 and that is corresponding to the transmission path 1, and the other end of the filter inductor is coupled to the positive input terminal of the load circuit 300. A filter inductor may filter a sub-current that flows through the filter inductor and that is of the first current, helping to enhance a direct current characteristic of the first current in general, and further helping to reduce power consumption of the load circuit 300 caused by a high frequency noise signal in the first current.

In addition, a feedback loop is further set between the switch-mode power supply 100 and the load circuit 300. Specifically, as shown in FIG. 1, a sampling resistor RT is further disposed between the N transmission paths and the load circuit 300. The ends, of the N transmission paths, connected in parallel are coupled to one end of the sampling resistor RT, and the other end of the sampling resistor RT is coupled to the positive input terminal of the load circuit 300. The first current is input to the load circuit 300 through the sampling resistor RT. The switch-mode power supply 100 is coupled to both ends of the sampling resistor RT. The switch-mode power supply 100 may sample, by using the sampling resistor RT, a current flowing through the sampling resistor RT. Specifically, the switch-mode power supply 100 may sample voltages at the two ends of the sampling resistor RT to obtain a voltage value of the sampling resistor RT, and then may obtain, based on a resistance value of the sampling resistor RT, a sampled current passing through the sampling resistor RT. In a connection relationship shown in FIG. 1, the sampled current passing through the sampling resistor RT is equivalent to the first current.

In addition, the switch-mode power supply 100 is further coupled to the positive input terminal of the load circuit 300, and the switch-mode power supply 100 may sample a first voltage provided to the load circuit 300. The first voltage may be understood as an input voltage of the load circuit 300, or a voltage received by the load circuit 300. Specifically, the switch-mode power supply 100 may detect a voltage difference between the positive input terminal of the load circuit 300 and the negative input terminal of the load circuit 300 to obtain the first voltage provided to the load circuit 300. Generally, the first voltage is slightly lower than an output voltage of the switch-mode power supply 100 due to a transmission loss.

It should be noted that a magnitude of the first current is usually determined by a load condition of the load circuit 300. That the load circuit 300 is a system on chip (SoC) is used as an example. In a working process of the electronic device, a total load of the SoC often fluctuates in a relatively large range, so that a relatively large fluctuation also occurs on the magnitude of the first current accordingly. A smartphone is used as an example. In a standby state, a total load of an SoC in the smartphone is relatively small, and a first current is also relatively small. However, when the smartphone runs a video game, the total load of the SoC is relatively large, and the first current is also relatively large.

If the switch-mode power supply 100 is a conventional switch-mode power supply without a load line function, processing logic of the switch-mode power supply 100 is to maintain the first voltage provided by the switch-mode power supply 100 to the load circuit 300 at a rated voltage. When a load of the load circuit 300 increases, the first current also increases accordingly, resulting in an increase in the output current of the switch-mode power supply 100. However, the switch-mode power supply 100 still maintains the first voltage at the rated voltage. As a result, output power of the switch-mode power supply 100 increases, and power consumption of the load circuit 300 also increases accordingly.

It should be noted that there is a delay in an output power response of the switch-mode power supply 100, that is, the switch-mode power supply 100 cannot increase the output power when the first current increases, so there is a fluctuation in the first voltage. Specifically, when the first current increases instantaneously, due to the delay in the output power response of the switch-mode power supply 100, the output voltage of the switch-mode power supply 100 decreases because of an increase in the output current. The load circuit 300 then detects a decrease in the first voltage. Then, the switch-mode power supply 100 increases the output power to enable the output voltage of the switch-mode power supply 100 to gradually increase until the first voltage detected by the switch-mode power supply 100 approaches the rated voltage.

Figure 2:
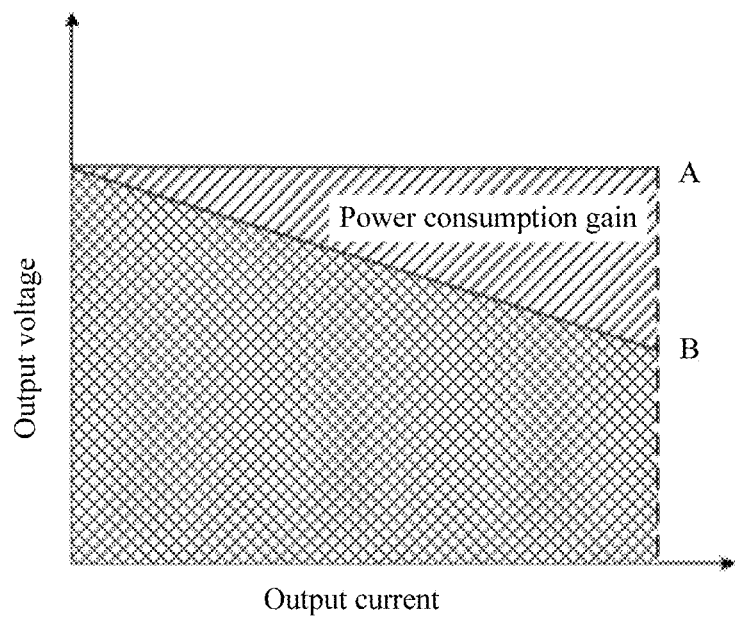
FIG. 2 is a schematic diagram of a power consumption gain of a load line function.

Therefore, it can be learned that if the switch-mode power supply 100 does not have the load line function, the output power of the switch-mode power supply 100 increases as the load of the load circuit 300 increases. In this case, power consumption of the switch-mode power supply 100 may be shown in FIG. 2. In FIG. 2, a curve A shows a relationship between an output voltage (equivalent to the first voltage) and an output current (equivalent to the first current) in a conventional switch-mode power supply without a load line function. An integration region of the curve A may represent power consumption of the switch-mode power supply without the load line function.

If the switch-mode power supply 100 is a switch-mode power supply with the load line function, the output voltage of the switch-mode power supply 100 linearly decreases when the output current increases, as shown by a curve B in FIG. 2. An integration region of the curve B may represent power consumption of a switch-mode power supply with the load line function. In FIG. 2, a part shown by a power consumption gain is a part by which the integration region of the curve A is larger than the integration region of the curve B. An area of a region of this part may represent power consumption reduced by the load line function, that is, the power consumption gain brought about by the load line function.

In addition, the load line function may further improve a transient characteristic of a switch-mode power supply. Specifically, due to a delay in a power response of the switch-mode power supply, when an output current of the switch-mode power supply increases instantaneously, an output voltage of the switch-mode power supply decreases instantaneously, and if the output voltage of the switch-mode power supply is excessively low, a load circuit stops working; when an output current of the switch-mode power supply decreases instantaneously, an output voltage of the switch-mode power supply increases instantaneously, and if the output voltage of the switch-mode power supply is excessively high, a load circuit is damaged, or lifetime of a load circuit is shortened. When the switch-mode power supply has a better transient characteristic, a smaller fluctuation occurs on the output voltage of the switch-mode power supply. This is more conducive to protection of the load circuit. For a switch-mode power supply with the load line function, at a moment when an output current changes, a smaller fluctuation of an output voltage of the switch-mode power supply means a better transient characteristic of the switch-mode power supply.

Many benefits can be brought about by the load line function, and some switch-mode power supplies with a specific design can implement the load line function at present. For example, a voltage regulator module (VRM) power supply is a switch-mode power supply with the load line function. However, a switch-mode power supply is a type of commonly used electronic element. There are many types and application scenarios for switch-mode power supplies. Relying only on specifically designing switch-mode power supplies may cause difficulty in selecting a type of switch-mode power supply. For example, a VRM power supply is an industrial-grade switch-mode power supply, and cannot be used in a vehicle. However, most automotive-grade switch-mode power supplies generally do not have the load line function at present. Therefore, a vehicle manufacturer can only customize a switch-mode power supply from a power supply manufacturer.

In view of this, an embodiment of this application provides a load line circuit. A voltage value of a feedback voltage provided by the load line circuit to a switch-mode power supply is linearly and positively correlated with each of a voltage value of a first voltage and a current value of a first current. The first voltage is a voltage provided to a load circuit, and the first current is a current provided to the load circuit. A conventional switch-mode power supply may also implement a load line function by adding the load line circuit to a feedback loop of the conventional switch-mode power supply (a switch-mode power supply without the load line function). In other words, the load line circuit provided in this embodiment of this application may enable an output voltage of the conventional switch-mode power supply to linearly decrease with an increase in an output current.

Figure 3:
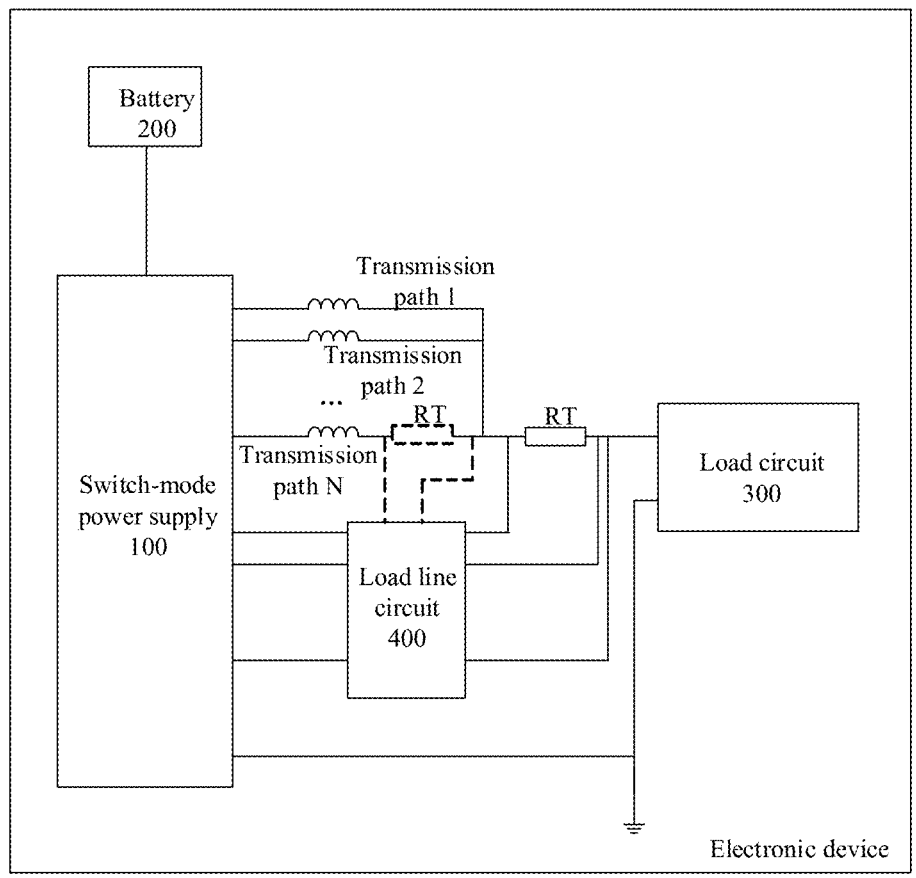
FIG. 3 is a schematic structural diagram of an electronic device according to an embodiment of this application.

For example, as shown in FIG. 3, in an electronic device, a load line circuit 400 provided in an embodiment of this application may be coupled to each of a feedback terminal of a switch-mode power supply 100, a positive input terminal and a negative input terminal of a load circuit 300, as well as two ends of a sampling resistor RT. The load line circuit 400 may generate a feedback voltage $V_F$ based on a voltage drop $V_T$ of the sampling resistor RT and a first voltage $V_1$ that is provided by the switch-mode power supply 100 to the load circuit 300.

It should be noted that a voltage value $V_T^0$ of the voltage drop $V_T$ of the sampling resistor RT is linearly and positively correlated with a current value $I_1^0$ of a first current $I_1$. Specifically, according to a connection relationship shown by a sampling resistor RT in a solid line in FIG. 3, the sampling resistor RT is located between N transmission paths and the load circuit 300. In this case, a sampled current $I_T$ passing through the sampling resistor RT is the first current $I_1$. Therefore, the voltage drop $V_T$ of the sampling resistor RT satisfies the following formula:

$$V_T^0 = I_1^0 \cdot R_T^0. \quad \text{(Formula 1)}$$

$R_T^0$ represents a resistance value of the sampling resistor RT, and is usually a constant.

In another embodiment, according to a connection relationship shown by a sampling resistor RT in a dashed line in FIG. 3, the sampling resistor RT is located in any of N transmission paths. Generally, the resistance value $R_T^0$ of the sampling resistor RT is relatively small, and does not have relatively great impact on a sub-current that passes through a transmission path and that is of the first current. Therefore, it may still be approximately considered that magnitudes of sub-currents, of the first current, over the N transmission paths are the same.

In this case, a current value of the sampled current $I_T$ is $$I_T^0 = \frac{I_1^0}{N}.$$

Therefore, the voltage drop $V_T$ of the sampling resistor RT satisfies the following formula:

$$V_T^0 = \frac{I_1^0}{N} \cdot R_T^0. \quad \text{(Formula 2)}$$

It can be learned from the formula 1 and the formula 2 that the voltage value of the voltage drop $V_T$ of the sampling resistor RT is linearly and positively correlated with the current value $I_1^0$ of the first current $I_1$, and a proportionality coefficient thereof may be the resistance value $R_T^0$ of the sampling resistor RT, or may be $$\frac{R_T^0}{N}.$$

When the first current $I_1$ increases, the voltage drop $V_T$ of the sampling resistor RT linearly increases accordingly.

In this embodiment of this application, a voltage value of the feedback voltage $V_F$ is linearly and positively correlated with each of a voltage value of the first voltage $V_1$ and the voltage value of the voltage drop $V_T$ of the sampling resistor RT, and the voltage value of the voltage drop $V_T$ of the sampling resistor RT is in turn linearly and positively correlated with the current value of the first current $I_1$. Therefore, the voltage value of the feedback voltage $V_F$ is linearly and positively correlated with each of the voltage value of the first voltage $V_1$ and the current value of the first current $I_1$. In other words, the voltage value of the first voltage $V_1$ is linearly and negatively correlated with the current value of the first current $I_1$. That is, if the conventional switch-mode power supply 100 keeps the feedback voltage $V_F$ stable at a rated voltage (or near a rated voltage), the first voltage $V_1$ linearly decreases with an increase in the first current $I_1$. Therefore, using the load line circuit 400 provided in this embodiment of this application can enable the conventional switch-mode power supply 100 to also implement the load line function.

For example, it is assumed that the first voltage $V_1$ is at the rated voltage before the first current $I_1$ increases. Then, after the first current $I_1$ increases, the feedback voltage $V_F$ exceeds the rated voltage. The load line circuit 400 feeds back the feedback voltage $V_F$ to the switch-mode power supply 100 that is a conventional switch-mode power supply. After the switch-mode power supply 100 receives the feedback voltage $V_F$, because the feedback voltage $V_F$ is greater than the rated voltage, the switch-mode power supply 100 reduces an output voltage until the feedback voltage $V_F$ returns to the rated voltage.

Figure 4:
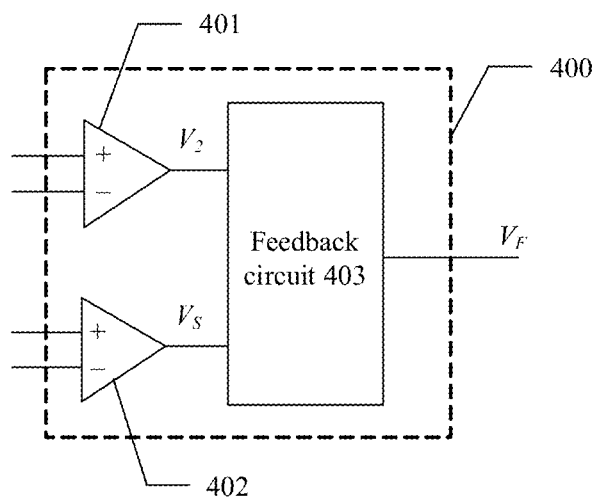
FIG. 4 is a schematic structural diagram of a load line circuit according to an embodiment of this application.

Next, a structure of the load line circuit 400 provided in this embodiment of this application is further described with an example. As shown in FIG. 4, the load line circuit 400 mainly includes a first sampling circuit 401, a second sampling circuit 402, and a feedback circuit 403. An output terminal of the first sampling circuit 401 is coupled to a first input terminal of the feedback circuit 403, and an output terminal of the second sampling circuit 402 is coupled to a second input terminal of the feedback circuit 403.

In this embodiment of this application, the first sampling circuit 401 may generate a second voltage $V_2$, and provide the second voltage $V_2$ to the feedback circuit 403. A voltage value of the second voltage $V_2$ is linearly and positively correlated with the voltage value of the first voltage $V_1$. The second sampling circuit 402 may generate a regulating voltage $V_S$, and provide the regulating voltage $V_S$ to the feedback circuit 403. A voltage value of the regulating voltage $V_S$ is linearly and positively correlated with the current value of the first current $I_1$. The feedback circuit 403 may generate the feedback voltage $V_F$ based on the second voltage $V_2$ and the regulating voltage $V_S$, and feed back the feedback voltage $V_F$ to the switch-mode power supply 100. The voltage value of the feedback voltage $V_F$ generated by the feedback circuit 403 is linearly and positively correlated with each of the voltage value of the second voltage $V_2$ and the voltage value of the regulating voltage $V_S$. Therefore, the voltage value of the feedback voltage $V_F$ is also linearly and positively correlated with each of the voltage value of the first voltage $V_1$ and the current value of the first current $I_1$.

For example, the second voltage $V_2$ satisfies the following formula:

$$V_2^0 = A_1 \cdot V_1^0. \quad \text{(Formula 3)}$$

$V_2^0$ represents the voltage value of the second voltage $V_2$, $V_1^0$ represents the voltage value of the first voltage $V_1$, and $A_1$ represents a proportionality coefficient between the first voltage $V_1$ and the second voltage $V_2$, where $A_1$ is greater than 0.

For example, the regulating voltage $V_S$ satisfies the following formula:

$$V_s^0 = A_2 \cdot R_T^0 \cdot I_T^0. \quad \text{(Formula 4)}$$

$V_S^0$ represents the voltage value of the regulating voltage $V_S$, $R_T^0$ represents the resistance value of the sampling resistor RT, $I_T^0$ represents the current value of the sampled current $I_T$, and $A_2$ represents a proportionality coefficient between the voltage drop $V_T$ of the sampling resistor RT and the regulating voltage $V_S$, where $A_2$ is greater than 0.

For example, the feedback voltage $V_F$ satisfies the following formula:

$$V_F^0 = B1 V_2^0 + B2 V_s^0. \quad \text{(Formula 5)}$$

$V_F^0$ presents the voltage value of the feedback voltage $V_F$, and B1 and B2 are both proportionality coefficients. In one embodiment, A1, A2, B1, and B2 may all be equal to 1.

With reference to the formulas 1 to 5, it can be learned that in this embodiment of this application, the voltage value $V_F^0$ of the feedback voltage $V_F$ that the load line circuit 400 may provide to the switch-mode power supply 100 is linearly and positively correlated with each of the voltage value $V_1^0$ of the first voltage $V_1$ and the current value $I_1^0$ of the first current $I_1$. In other words, the voltage value $V_1^0$ of the first voltage $V_1$ is linearly and negatively correlated with the current value $I_1^0$ of the first current $I_1$. The first voltage $V_1$ may be equivalent to the output voltage of the switch-mode power supply 100, and the first current $I_1$ may be equivalent to an output current of the switch-mode power supply 100. Therefore, the load line circuit 400 provided in this embodiment of this application can enable the output voltage of the switch-mode power supply 100 to linearly decrease with an increase in the output current of the switch-mode power supply 100, that is, the load line circuit 400 provided in this embodiment of this application can enable the switch-mode power supply 100 to implement the load line function.

Next, this embodiment of this application further describes each of the first sampling circuit 401, the second sampling circuit 402, and the feedback circuit 403 by using the following specific examples.

First Sampling Circuit 401

Figure 5:
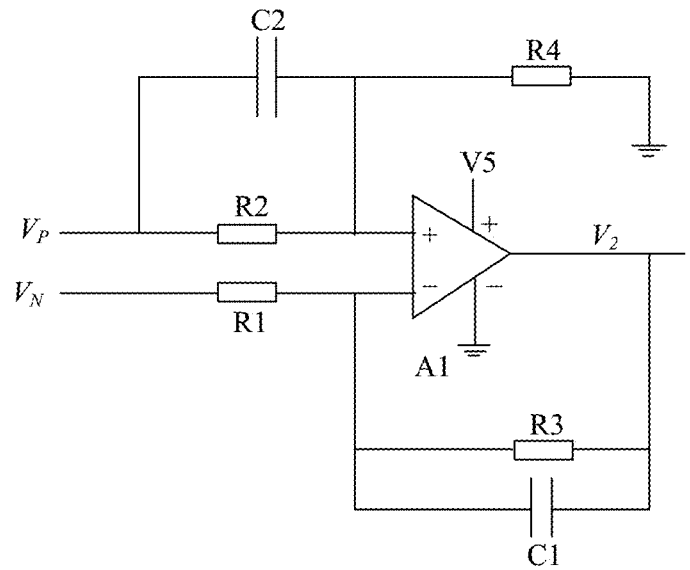
FIG. 5 is a schematic structural diagram of a first sampling circuit according to an embodiment of this application.

FIG. 5 shows an example of a schematic structural diagram of the first sampling circuit 401. As shown in FIG. 5, the first sampling circuit 401 mainly includes a resistor R1, a resistor R2, a resistor R3, a resistor R4, and a first differential amplifier A1. One end of the resistor R1 is configured to be coupled to the negative input terminal of the load circuit 300, and the other end of the resistor R1 is coupled to a negative input terminal (denoted by a "−" sign in FIG. 5) of the first differential amplifier A1. One end of the resistor R3 is coupled to the negative input terminal of the first differential amplifier A1, and the other end of the resistor R3 is coupled to an output terminal of the first differential amplifier A1. One end of the resistor R2 is configured to be coupled to the positive input terminal of the load circuit 300, and the other end of the resistor R2 is coupled to a positive input terminal (denoted by a "+" sign in FIG. 5) of the first differential amplifier A1. One end of the resistor R4 is coupled to the positive input terminal of the first differential amplifier A1, and the other end of the resistor R4 is coupled to a grounding circuit.

A positive electrode of the first differential amplifier A1 may receive a constant current voltage V5, a negative electrode of the first differential amplifier A1 is coupled to the grounding circuit, and the constant current voltage V5 is used to supply energy to the first differential amplifier A1.

Specifically, the resistor R2 may receive a voltage $V_P$ of the positive input terminal of the load circuit 300, and the resistor R1 may receive a voltage $V_N$ of the negative input terminal of the load circuit 300. A bias voltage difference between the voltage $V_P$ and the voltage $V_N$ may be understood as the first voltage $V_1$.

Based on the circuit structure shown in FIG. 5, a voltage $V_{1+}$ of the positive input terminal of the first differential amplifier A1 may be expressed by a formula 6:

$$V_{1+}^0 = \frac{R_4^0}{R_2^0 + R_4^0} \cdot V_P^0. \quad \text{(Formula 6)}$$

$V_{1+}^0$ represents a voltage value of the voltage $V_{1+}$ of the positive input terminal of the first differential amplifier A1, $R_4^0$ represents a resistance value of the resistor R4, $R_2^0$ represents a resistance value of the resistor R2, and $V_P^0$ represents a voltage value of the voltage $V_P$ of the positive input terminal of the load circuit 300.

A voltage $V_{1-}$ of the negative input terminal of the first differential amplifier A1 may be expressed by a formula 7:

$$V_{1-}^0 = \frac{R_3^0 V_N^0 + R_1^0 \cdot V_2^0}{R_1^0 + R_3^0}. \quad \text{(Formula 7)}$$

$V_{1-}^0$ represents a voltage value $V_{1-}$ of the voltage of the negative input terminal of the first differential amplifier A1, $R_3^0$ represents a resistance value of the resistor R3, $R_1^0$ represents a resistance value of the resistor R1, and $V_N^0$ represents a voltage value of the voltage $V_N$ of the negative input terminal of the load circuit 300.

Because the voltage $V_{1+}$ is equal to the voltage $V_{1-}$ in the first differential amplifier A1, it may be obtained, through calculation based on the formula 6 and the formula 7, that the second voltage $V_2$ satisfies the following formula 8:

$$V_2^0 = \frac{R_4^0(R_1^0 + R_3^0)}{R_1^0(R_2^0 + R_4^0)} V_P^0 - \frac{R_3^0}{R_1^0} V_N^0. \qquad \text{(Formula 8)}$$

It is assumed that the resistance value $R_4^0$ of the resistor R4 is the same as the resistance value $R_3^0$ of the resistor R3, and the resistance value $R_2^0$ of the resistor R2 is the same as the resistance value $R_1^0$ of the resistor R1. Then, the formula 8 may be simplified as:

$$V_2^0 = \frac{R_3^0}{R_1^0}(V_P^0 - V_N^0) = \frac{R_3^0}{R_1^0} V_1^0. \qquad \text{(Formula 9)}$$

It can be learned from the formula 9 that the voltage value $V_2^0$ of the second voltage $V_2$ is linearly and positively correlated with the voltage value $V_1^0$ of the first voltage $V_1$, and a proportionality coefficient is $$\frac{R_3^0}{R_1^0}.$$

In one embodiment, the resistance value of the resistor R1, the resistance value of the resistor R2, the resistance value of the resistor R3, and the resistance value of the resistor R4 are the same. In this case, the formula 9 may be further simplified as:

$$V_2^0 = V_1^0. \qquad \text{(Formula 10)}$$

It can be learned from the formula 10 that if the resistance value $R_1^0$ of the resistor R1, the resistance value $R_2^0$ of the resistor R2, the resistance value $R_3^0$ of the resistor R3, and the resistance value $R_4^0$ of the resistor R4 are the same, the voltage value $V_2^0$ of the second voltage $V_2$ provided by the first sampling circuit 401 to the feedback circuit 403 is the same as the voltage value $V_1^0$ of the first voltage $V_1$.

In one embodiment, as shown in FIG. 5, the first sampling circuit 401 further includes a first capacitor C1, and the first capacitor C1 is connected to the resistor R3 in parallel. The first capacitor C1 may integrate and filter a high frequency signal, in the first voltage, detected by the first sampling circuit 401, thereby reducing a high frequency noise in the feedback voltage, and further helping to improve stability of the switch-mode power supply 100.

In addition, differential sampling bandwidth and a voltage gain are important performance indicators of the first sampling circuit 401. When the sampling bandwidth and the voltage gain of the first sampling circuit 401 are higher, a high frequency signal detection result of the first sampling circuit 401 is more accurate. In view of this, in one embodiment, as shown in FIG. 5, the first sampling circuit 401 may further include a second capacitor C2, and the second capacitor C2 is connected to the resistor R2 in parallel.

Figure 6:
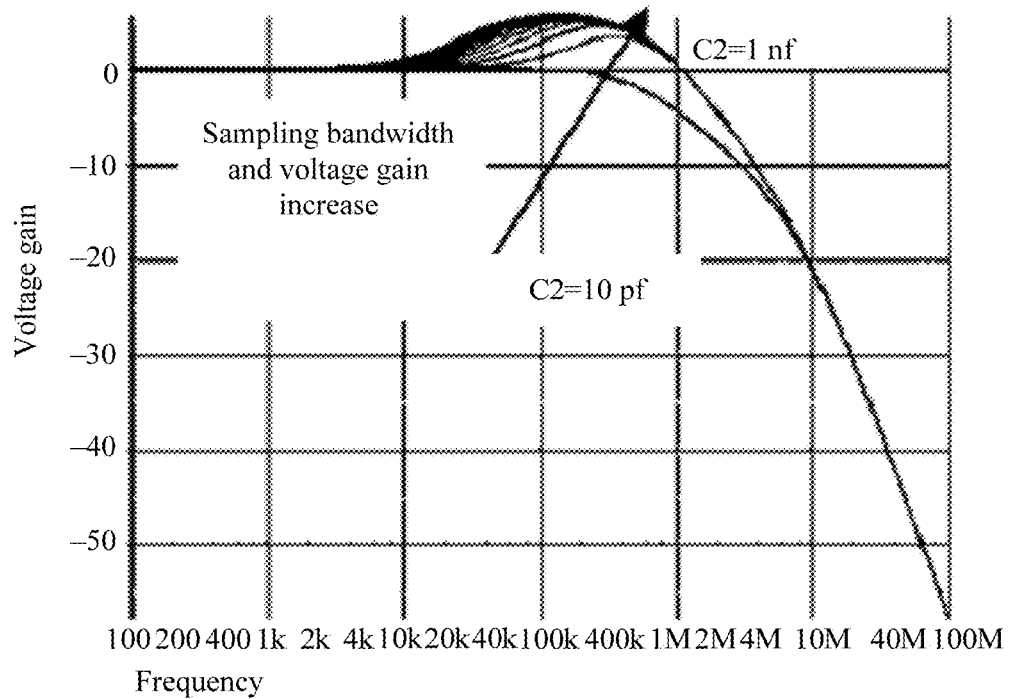
FIG. 6 is a schematic diagram of a frequency-voltage gain curve of a first sampling circuit according to an embodiment of this application.

In this case, a frequency-voltage gain curve of the first sampling circuit 401 may be as shown in FIG. 6. In FIG. 6, a horizontal coordinate represents a frequency, and a vertical coordinate represents a voltage gain. FIG. 6 shows a plurality of frequency-voltage gain curves. Different frequency-voltage gain curves correspond to different capacitance values of the second capacitor C2. Along a direction of an arrow in FIG. 6, the plurality of frequency-voltage gain curves in FIG. 6 correspond to different capacitance values of 10 pF to 1 nF of the second capacitor C2. It can be learned from FIG. 6 that proper configuration of a capacitance value of the second capacitor C2 enables a voltage gain to increase from a gain 0 with an increase in a frequency, and the voltage gain is a positive value. After the voltage gain reaches a maximum value, the voltage gain decreases with an increase in the frequency, and crosses the gain 0, and the voltage gain becomes a negative value.

A frequency corresponding to a location at which the voltage gain starts to increase from the gain 0 may be referred to as a zero break frequency $f_Z$, and a frequency corresponding to a location at which the voltage gain crosses the gain 0 and becomes a negative value may be referred to as a pole break frequency $f_P$. In this embodiment of this application, in consideration of impact of a high frequency noise signal, the voltage $V_{1+}$ of the positive input terminal of the first differential amplifier A1 may be expressed as:

$$V_{1+}^0 = \frac{R_4^0(R_2^0 C_2^0 S + 1)}{R_4^0 R_2^0 C_2^0 S + R_2^0 + R_4^0} \cdot V_P^0. \qquad \text{(Formula 11)}$$

In the formula 11, $C_2^0$ represents the capacitance value of the second capacitor C2, and $C_2^0 S$ represents a reciprocal of a frequency-domain impedance of the second capacitor C2.

It may be obtained, through calculation based on the formula 11, that the zero break frequency may be expressed as:

$$f_z^0 = \frac{1}{2\pi R_2^0 C_2^0}. \qquad \text{(Formula 12)}$$

$f_Z^0$ is a frequency value of the zero break frequency $f_Z$. The pole break frequency $f_P$ may be expressed as:

$$f_P^0 = \frac{R_2^0 + R_4^0}{2\pi R_2^0 R_4^0}. \qquad \text{(Formula 13)}$$

$f_P^0$ is a frequency value of the pole break frequency $f_P$.

It can be learned from FIG. 6, the formula 12, and the formula 13 that the zero break frequency $f_Z$ is less than the pole break frequency $f_P$, and between the zero break frequency $f_Z$ and the pole break frequency $f_P$, the voltage gain of the first sampling circuit 401 is a positive value. Therefore, the second capacitor may increase the voltage gain of the first sampling circuit 401. Correspondingly, a range between the zero break frequency $f_Z$ and the pole break frequency $f_P$ may also be referred to as the sampling bandwidth of the first sampling circuit 401. It can be learned that adding the second capacitor C2 to the first sampling circuit 401 helps to increase the sampling bandwidth and the voltage gain of the first sampling circuit 401, and further helps to improve a detection speed of the first sampling circuit 401 and accuracy of a detection result.

Second Sampling Circuit 402

Figure 7:
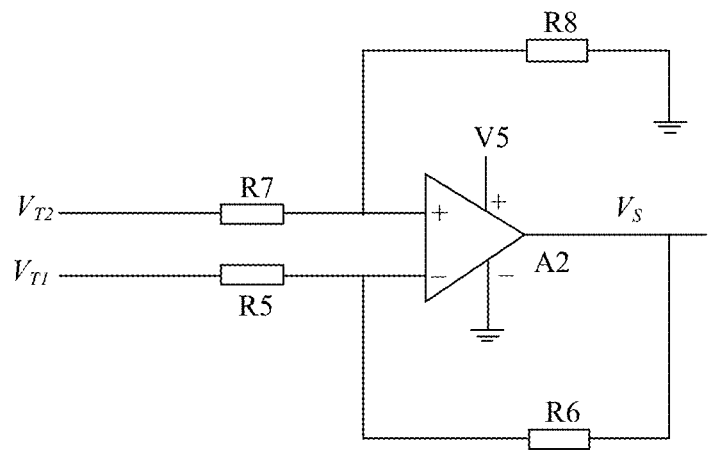
FIG. 7 is a schematic structural diagram of a second sampling circuit according to an embodiment of this application.

FIG. 7 shows an example of a schematic structural diagram of the second sampling circuit 402 as an example. As shown in FIG. 7, the second sampling circuit 402 mainly includes a resistor R5, a resistor R6, a resistor R7, a resistor R8, and a second differential amplifier A2. One end of the resistor R5 is configured to be coupled to a first terminal of the sampling resistor RT, and the other end of the resistor R5 is coupled to a negative input terminal of the second differential amplifier A2.

The sampling resistor RT may be as shown in FIG. 3. The first terminal of the sampling resistor RT is coupled to the load circuit 300, and a second terminal of the sampling resistor RT is coupled to N positive output terminals of the switch-mode power supply 100 through the N transmission paths. The second terminal of the sampling resistor RT may alternatively be coupled to one of the N positive output terminals of the switch-mode power supply 100, that is, the sampling resistor RT is located in any of the N transmission paths.

One end of the resistor R6 is coupled to the negative input terminal of the second differential amplifier A2, and the other end of the resistor R6 is coupled to an output terminal of the second differential amplifier A2. One end of the resistor R7 is configured to be coupled to the second terminal of the sampling resistor RT, and the other end of the resistor R7 is coupled to a positive input terminal of the second differential amplifier A2. One end of the resistor R8 is coupled to the positive input terminal of the second differential amplifier A2, and the other end of the resistor R8 is coupled to the grounding circuit.

Specifically, the resistor R7 may receive a voltage $V_{T2}$ of the second terminal of the sampling resistor RT, and the resistor R5 may receive a voltage $V_{T1}$ of the first terminal of the sampling resistor RT. A difference between the voltage $V_{T2}$ of the second terminal of the sampling resistor RT and the voltage $V_{T1}$ of the first terminal of the sampling resistor RT may be understood as the voltage drop $V_T$ of the sampling resistor RT.

For example, based on the circuit structure shown in FIG. 7, a voltage $V_{2+}$ of the positive input terminal of the second differential amplifier A2 may be expressed by a formula 14:

$$V_{2+}^0 = \frac{R_8^0}{R_7^0 + R_8^0} \cdot V_{T2}^0. \qquad \text{(Formula 14)}$$

$V_{2+}^0$ represents a voltage value of the voltage $V_{2+}$ of the positive input terminal of the second differential amplifier A2, $R_8^0$ represents a resistance value of the resistor R8, $R_7^0$ represents a resistance value of the resistor R7, and $V_{T2}^0$ represents a voltage value of the voltage $V_{T2}$ of the second terminal of the sampling resistor RT.

A voltage $V_{2-}$ of the negative input terminal of the second differential amplifier A2 may be expressed by a formula 15:

$$V_{2-}^0 = \frac{R_6^0 V_{T1}^0 + R_5^0 \cdot I_s^0}{R_5^0 + R_6^0}. \qquad \text{(Formula 15)}$$

$V_{2-}^0$ represents a voltage value of the voltage $V_{2-}$ of the negative input terminal of the second differential amplifier A2, $R_5^0$ represents a resistance value of the resistor R5, $R_6^0$ represents a resistance value of the resistor R6, and $V_{T1}^0$ represents a voltage value of the voltage $V_{T1}$ of the first terminal of the sampling resistor RT.

Because the voltage $V_{2+}$ of the positive input terminal is equal to the voltage $V_{2-}$ of the negative input terminal in the second differential amplifier A2, it may be obtained, through calculation based on the formula 14 and the formula 15, that the regulating voltage $V_S$ satisfies the following formula 16:

$$V_s^0 = \frac{R_8^0(R_5^0 + R_6^0)}{R_5^0(R_8^0 + R_7^0)} V_{T2}^0 - \frac{R_6^0}{R_5^0} V_{T1}^0. \qquad \text{(Formula 16)}$$

In one embodiment, the resistance value $R_5^0$ of the resistor R5 is the same as the resistance value $R_7^0$ of the resistor R7, and the resistance value $R_6^0$ of the resistor R6 is the same as the resistance value $R_8^0$ of the resistor R8. In this case, the formula 16 may be simplified as:

$$V_s^0 = \frac{R_6^0}{R_5^0}(V_{T2}^0 - V_{T1}^0) = \frac{R_6^0}{R_5^0} V_T^0. \qquad \text{(Formula 17)}$$

It can be learned from the formula 17 that the voltage value $V_S^0$ of the regulating voltage $V_S$ is linearly and positively correlated with the voltage value of the voltage drop of the sampling resistor RT. The voltage value $V_T^0$ of the voltage drop of the sampling resistor RT is in turn linearly and positively correlated with the current value $I_1^0$ of the first current $I_1$. Therefore, the voltage value $V_S^0$ of the regulating voltage $V_S$ is linearly and positively correlated with the current value $I_1^0$ of the first current $I_1$. The regulating voltage $V_S$ linearly increases with an increase in the first current $I_1$. If the feedback voltage $V_S$ remains at the rated voltage, the second voltage $V_2$ linearly decreases. Because the voltage value $V_2^0$ of the second voltage $V_2$ is linearly and positively correlated with the voltage value $V_1^0$ of the first voltage $V_1$, the first voltage $V_1$ linearly decreases accordingly. In other words, the load line function is implemented.

Figure 8:
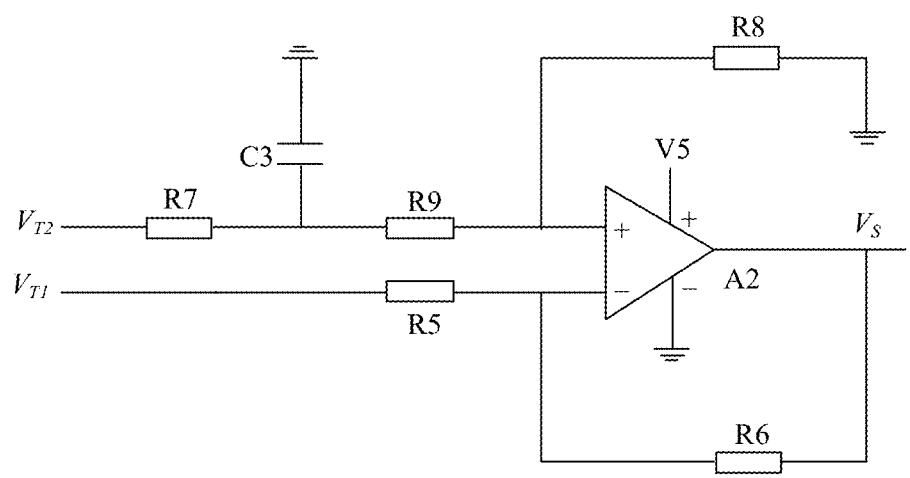
FIG. 8 is a schematic structural diagram of a second sampling circuit according to an embodiment of this application.

In another embodiment of the second sampling circuit 402, as shown in FIG. 8, the second sampling circuit 402 may further include a resistor R9 and a third capacitor C3. A first terminal of the resistor R9 is coupled to the resistor R7, and a second terminal of the resistor R9 is coupled to the positive input terminal of the second differential amplifier A2. One end of the third capacitor C3 is coupled to the first terminal of the resistor R9, and the other end of the third capacitor C3 is grounded.

The resistor R7 and the third capacitor C3 may form a first-order filter circuit to filter out a high frequency noise signal from an input signal (that is, the voltage $V_{T2}$ of the second terminal of the sampling resistor RT) of the second differential amplifier A2, thereby helping to improve accuracy of a sampling result of the second sampling circuit 402 and enhance stability of the second sampling circuit 402.

Figure 9:
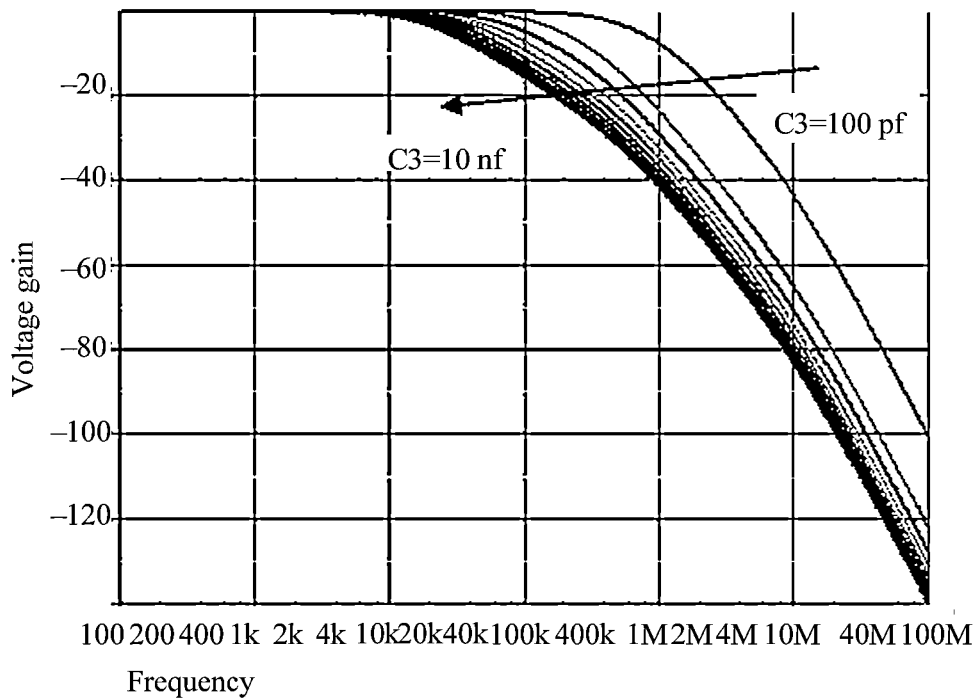
FIG. 9 is a schematic diagram of a frequency-voltage gain curve of a second sampling circuit according to an embodiment of this application.

Specifically, FIG. 9 shows an example of a plurality of frequency-voltage gain curves of the second sampling circuits 402. In FIG. 9, a horizontal coordinate represents a frequency, and a vertical coordinate represents a voltage gain. Along a direction of an arrow in FIG. 9, the plurality of frequency-voltage gain curves correspond to capacitance values of 100 pF to 10 nF of the third capacitor C3. Sampling bandwidth of the second sampling circuit 402 may be defined as a frequency range between a frequency corresponding to a location at which a voltage gain starts to decrease from 0 and a frequency corresponding to a location at which the voltage gain is −20 dB.

It can be learned from FIG. 9 that when a capacitance value of the third capacitor C3 increases, a time constant of the first-order filter circuit increases accordingly, and the sampling bandwidth of the second sampling circuit 402 gradually decreases. Generally, to reduce impact of the first-order filter circuit on the sampling bandwidth of the second sampling circuit 402, the time constant of the first-order filter circuit formed by the resistor R7 and the third capacitor C3 needs to be greater than twice a switching period of the switch-mode power supply 100, and the third capacitor C3 should not be excessively large.

Based on the circuit structure shown in FIG. 8, a voltage $V_{2+}$ of the positive input terminal of the second differential amplifier A2 may be expressed by a formula 18:

$$V_{2+}^0 = \frac{R_8^0}{R_7^0 + R_8^0 + R_9^0} \cdot V_{T2}^0. \quad \text{(Formula 18)}$$

$R_9^0$ represents a resistance value of the resistor R9.

A voltage $V_{2-}$ of the negative input terminal of the second differential amplifier A2 may be expressed by the formula 15. Details are not described herein again.

Because the voltage $V_{2+}$ of the positive input terminal is equal to the voltage $V_{2-}$ of the negative input terminal in the second differential amplifier A2, it may be obtained, through calculation based on the formula 18 and the formula 15, that the regulating voltage $V_S$ satisfies the following formula:

$$V_s^0 = \frac{R_8^0(R_5^0 + R_6^0)}{R_8^0(R_8^0 + R_7^0 + R_9^0)} V_{T2}^0 - \frac{R_6^0}{R_5^0} V_{T1}^0. \quad \text{(Formula 19)}$$

In one embodiment, the resistance value $R_5^0$ of the resistor R5 is equal to a sum of the resistance value $R_7^0$ of the resistor R7 and the resistance value $R_0^0$ of the resistor R9, and the resistance value $R_6^0$ of the resistor R6 is the same as the resistance value $R_8^0$ of the resistor R8. In this case, the formula 19 may be simplified as the formula 17.

In one embodiment, if the sampling resistor RT is located between the N transmission paths and the load circuit 300, as shown by the sampling resistor RT in the solid line in FIG. 3, the resistance value $R_5^0$ of the resistor R5 may be the same as the resistance value $R_6^0$ of the resistor R6. The formula 17 may be further simplified as:

$$V_s^0 = V_T^0 = R_T^0 \cdot I_1^0. \quad \text{(Formula 20)}$$

It can be learned from the formula 20 that in this case, the voltage value $V_S^0$ of the regulating voltage $V_S$ is linearly and positively correlated with the current value $I_1^0$ of the first current $I_1$, and a proportionality coefficient is the resistance value $R_T^0$ of the sampling resistor RT.

In another embodiment, if the sampling resistor RT is located in any of the N transmission paths, as shown by the sampling resistor RT in the dashed line in FIG. 3, the resistance value $R_6^0$ of the resistor R6 may be N times the resistance value of the resistor R5. The formula 17 may also be further simplified as the formula 20.

Feedback Circuit 403

In one embodiment, the feedback circuit 403 may perform additive operational amplifying processing on the second voltage $V_2$ and the regulating voltage $V_S$ to generate the feedback voltage $V_F$. Specifically, the feedback circuit 403 may be implemented based on an additive operational amplifying circuit. The additive operational amplifying circuit performs additive operational amplifying processing on the second voltage $V_2$ and the regulating voltage $V_S$ to obtain the feedback voltage $V_F$.

It should be understood that there are a plurality of possible embodiments for the feedback circuit 403. For example, the feedback circuit 403 may be implemented by using an analog circuit (for example, the foregoing additive operational amplifying circuit), or may be implemented in a manner of combining an analog circuit and a digital circuit. This is not limited in this embodiment of this application. If the feedback circuit 403 is an additive operational amplifying circuit, the feedback circuit 403 may be a non-inverting additive circuit, or may be an inverting additive circuit. This is not limited in this embodiment of this application.

Figure 10:
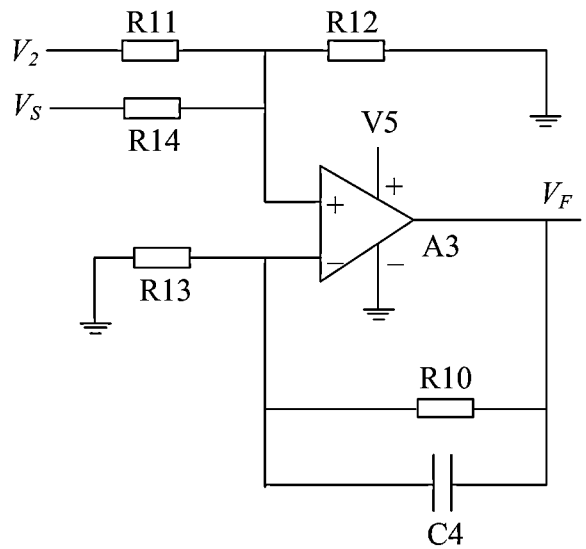
FIG. 10 is a schematic structural diagram of a feedback circuit according to an embodiment of this application.

For example, FIG. 10 shows an example of a schematic structural diagram of the feedback circuit 403 as an example. As shown in FIG. 10, the feedback circuit 403 includes a resistor R10, a resistor R11, a resistor R12, a resistor R13, a resistor R14, and a third differential amplifier A3. One end of the resistor R11 is coupled to the output terminal of the first sampling circuit 401, the other end of the resistor R11 is coupled to each of one end of the resistor R12 and a positive input terminal of the third differential amplifier A3, and the other end of the resistor R12 is grounded. One end of the resistor R14 is coupled to the output terminal of the second sampling circuit 402, and the other end of the resistor R14 is coupled to the positive input terminal of the third differential amplifier. One end of the resistor R13 is grounded, and the other end of the resistor R13 is coupled to a negative input terminal of the third differential amplifier. One end of the resistor R10 is coupled to the negative input terminal of the third differential amplifier A3, and the other end of the resistor R10 is coupled to an output terminal of the third differential amplifier A3.

In the feedback circuit 403, the resistor R11 may receive the second voltage $V_2$ provided by the first sampling circuit 401, the resistor R14 may receive the regulating voltage $V_S$ provided by the second sampling circuit 402, and the third differential amplifier A3 may generate the feedback voltage $V_F$ based on the second voltage $V_2$ and the regulating voltage $V_S$. The feedback voltage $V_F$ is fed back to the switch-mode power supply 100 so that the switch-mode power supply 100 may regulate the output voltage based on the received feedback voltage $V_F$.

Based on the circuit structure shown in FIG. 10, a voltage $V_{3+}$ of the positive input terminal of the third differential amplifier A3 may be expressed by a formula 21:

$$V_{3+}^0 = \frac{R_{12}^0 R_{14}^0 V_2^0 + R_{11}^0 R_{12}^0 V_s^0}{R_{11}^0 R_{12}^0 + R_{11}^0 R_{14}^0 + R_{12}^0 R_{14}^0}. \quad \text{(Formula 21)}$$

$V_{3+}^0$ represents a voltage value of the voltage $V_{3+}$ of the positive input terminal of the third differential amplifier A3, $R_{11}^0$ represents a resistance value of the resistor R11, $R_{12}^0$ represents a resistance value of the resistor R12, and $R_{14}^0$ represents a resistance value of the resistor R14.

A voltage $V_{3-}$ of the negative input terminal of the third differential amplifier A3 may be expressed by a formula 22:

$$V_{3-}^0 = \frac{R_{13}^0 V_F^0}{R_{10}^0 + R_{13}^0}. \quad \text{(Formula 22)}$$

$V_{3-}^0$ represents a voltage value of the voltage $V_{3-}$ of the negative input terminal of the third differential amplifier A3, $R_{10}^0$ represents a resistance value of the resistor R10, $R_{13}^0$ represents a resistance value of the resistor R13, and $V_F^0$ represents the voltage value of the feedback voltage $V_F$.

Because the voltage $V_{3+}$ of the positive input terminal is equal to the voltage $V_{3-}$ of the negative input terminal in the third differential amplifier A3, the following formula may be obtained through calculation based on the formula 21 and the formula 22:

$$V_F^0 = \frac{R_{10}^0 + R_{13}^0}{R_{13}^0} \cdot \frac{R_{12}^0 R_{14}^0 V_2^0 + R_{11}^0 R_{12}^0 V_s^0}{R_{11}^0 R_{12}^0 + R_{11}^0 R_{14}^0 + R_{12}^0 R_{14}^0}. \qquad \text{(Formula 23)}$$

It can be learned from the formula 23 that the voltage value $V_F^0$ of the feedback voltage $V_F$ is linearly and positively correlated with the voltage value of the second voltage and the voltage value $V_S^0$ of the regulating voltage $V_S$. Therefore, feeding back the feedback voltage $V_F$ to the switch-mode power supply 100 can enable the output voltage of the switch-mode power supply 100 to linearly decrease with an increase in the output current of the switch-mode power supply 100, that is, the load line function is implemented.

In one embodiment, the resistance value $R_{11}^0$ of the resistor R11, the resistance value $R_{12}^0$ of the resistor R12, and the resistance value $R_{14}^0$ of the resistor R14 are the same, and the resistance value $R_{10}^0$ of the resistor R10 is twice the resistance value $R_{13}^0$ of the resistor R13. In this case, the formula 23 may be simplified as a formula 24.

$$V_F^0 = V_2^0 + V_s^0. \qquad \text{(Formula 24)}$$

That is, the voltage value $V_F^0$ of the feedback voltage $V_F$ is a sum of the voltage value $V_2^0$ of the second voltage $V_S$ and the voltage value $V_S^0$ of the regulating voltage $V_S$. In a specific application scenario, with reference to the formula 10 and the formula 20, when $R_T^0=1$, the formula 24 may be further simplified as:

$$V_F^0 = V_1^0 + I_1^0. \qquad \text{(Formula 25)}$$

That is, the voltage value $V_F^0$ of the feedback voltage $V_F$ is a sum of the voltage value $V_1^0$ of the first voltage $V_1$ and the current value $I_1^0$ of the first current $I_1$. As shown by the formula 25, a linear and negative correlation relationship between the voltage value $V_1^0$ of the first voltage $V_1$ and the current value $I_1^0$ of the first current $I_1$ in this embodiment of this application can be shown more directly.

In one embodiment, as shown in FIG. 10, the feedback circuit 403 further includes a fourth capacitor C4. One end of the fourth capacitor C4 is coupled to the negative input terminal of the third differential amplifier A3, and the other end of the fourth capacitor C4 is coupled to the output terminal of the third differential amplifier A3. Similar to the first capacitor C1 in the first sampling circuit 401, the fourth capacitor C4 may also generate a feedback pole. This can improve accuracy and stability of the feedback circuit. Details are not described herein again.

Transient Response

In addition, as a peripheral circuit of a conventional switch-mode power supply, the load line circuit 400 in this embodiment of this application can enable the switch-mode power supply to implement the load line function, and further help to improve a transient response of the switch-mode power supply. In this embodiment of this application, power supply simulation software Simplis is used to build a simulation circuit to verify an effect of improving the transient response of the switch-mode power supply by the load line circuit 400.

Figure 11:
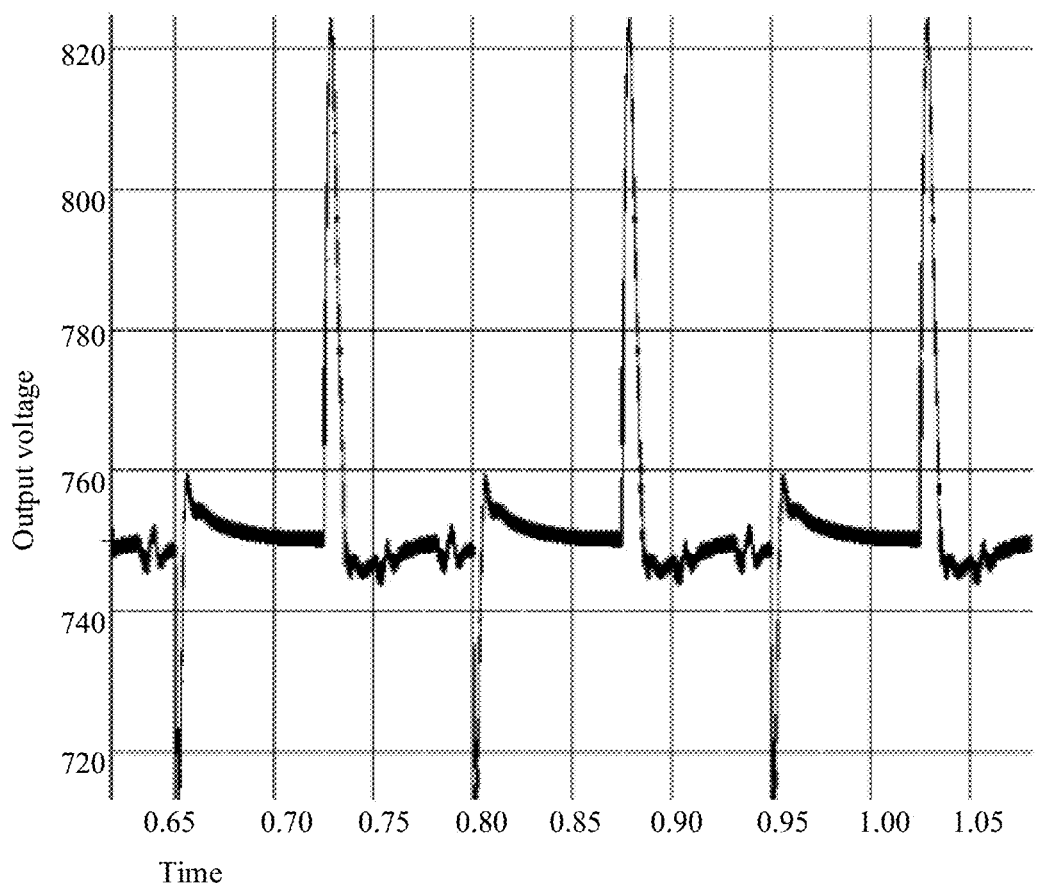
FIG. 11 is a schematic simulation diagram of an output voltage of a conventional switch-mode power supply according to an embodiment of this application.

FIG. 11 shows an example of a schematic diagram of an output voltage of a conventional switch-mode power supply. A vertical coordinate represents an output voltage, and a horizontal coordinate represents time. FIG. 11 shows a voltage curve of the conventional switch-mode power supply, and an output voltage of the switch-mode power supply changes periodically. As shown in FIG. 11, the output voltage of the switch-mode power supply suddenly decreases at 0.65 ms, suddenly increases at 0.725 ms, suddenly decreases at 0.8 ms, suddenly decreases at 0.875 ms, and so on. It can be learned from FIG. 11 that a peak-to-peak voltage of the output voltage of the switch-mode power supply is approximately 112 mV.

Figure 12:
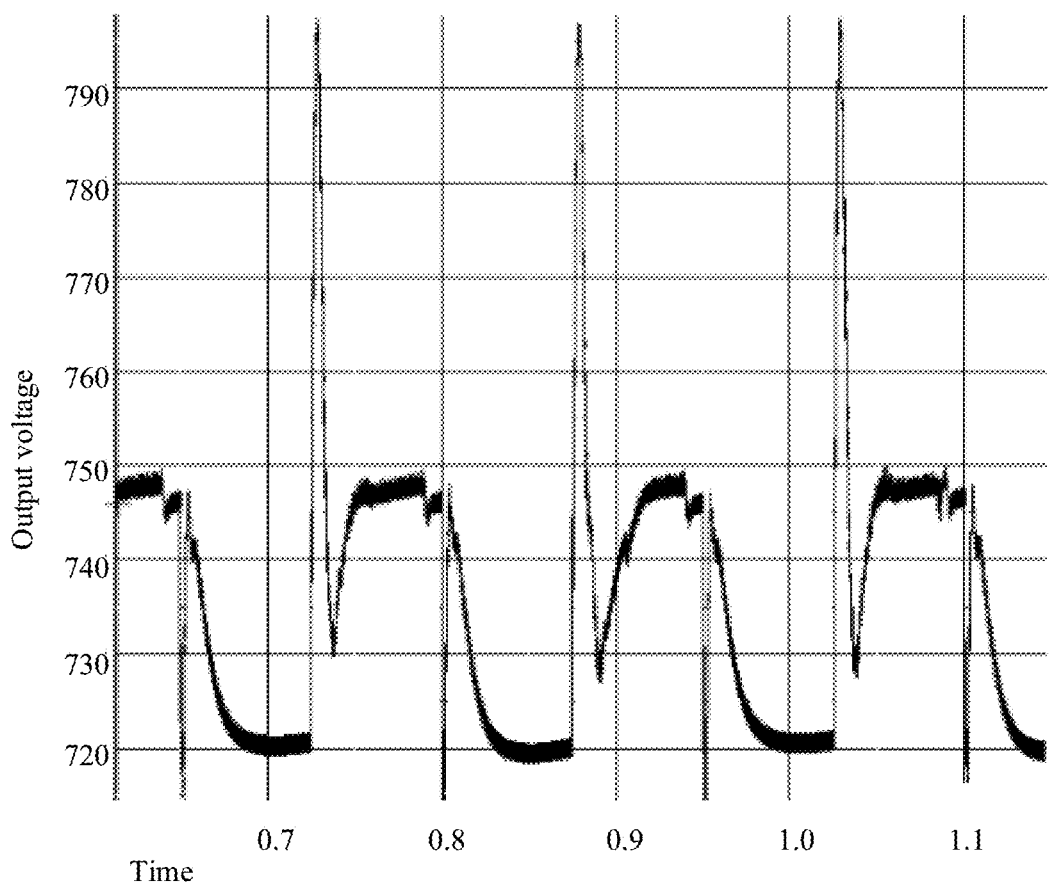
FIG. 12 is a schematic simulation diagram of an output voltage of a conventional switch-mode power supply integrating a load line circuit according to an embodiment of this application.

FIG. 12 shows a voltage curve of a switch-mode power supply in a case in which the load line circuit 400 provided in this embodiment of this application is disposed. An output current of the switch-mode power supply is the same as the output current of the switch-mode power supply in FIG. 11. It can be learned from FIG. 12 that a peak-to-peak voltage of an output voltage of the switch-mode power supply is approximately 83 mV. Therefore, it is verified through experiments that the load line circuit 400 provided in this embodiment of this application is helpful in reducing the peak-to-peak voltage of the output voltage of the switch-mode power supply, that is, reducing a fluctuation of the output voltage of the switch-mode power supply, and is helpful in improving the transient response of the switch-mode power supply.

Obviously, a person skilled in the art can make various modifications and variations to this application without departing from the spirit and scope of this application. This application is intended to cover these modifications and variations provided that they fall within the scope of protection defined by the following claims and their equivalent technologies of this application.

What is claimed is:

1. A load line circuit, comprising;
a first sampling circuit configured to generate a second voltage and provide the second voltage to a feedback circuit, wherein a voltage value of the second voltage is linearly and positively correlated with a voltage value of a first voltage, wherein the first voltage is a voltage provided by a switch-mode power supply to a load circuit, and wherein an output terminal of the first sampling circuit is coupled to a first input terminal of the feedback circuit;
a second sampling circuit configured to generate a regulating voltage and provide the regulating voltage to the feedback circuit, wherein a voltage value of the regulating voltage is linearly and positively correlated with a current value of a first current, wherein the first current is a current provided by the switch-mode power supply to the load circuit, and wherein an output terminal of the second sampling circuit is coupled to a second input terminal of the feedback circuit; and
the feedback circuit configured to generate a feedback voltage based on the second voltage and the regulating voltage, and feed back the feedback voltage to the switch-mode power supply, wherein a voltage value of the feedback voltage is linearly and positively correlated with each of the voltage value of the second voltage and the voltage value of the regulating voltage, and wherein an output terminal of the feedback circuit is configured to be coupled to the switch-mode power supply.

2. The load line circuit according to claim 1, wherein the first sampling circuit comprises a resistor R1, a resistor R2, a resistor R3, a resistor R4, and a first differential amplifier, wherein
   wherein a first end of the resistor R1 is configured to be coupled to a negative input terminal of the load circuit, and a second end of the resistor R1 is coupled to a negative input terminal of the first differential amplifier;
   wherein a first end of the resistor R3 is coupled to the negative input terminal of the first differential amplifier, and a second end of the resistor R3 is coupled to an output terminal of the first differential amplifier;
   wherein a first end of the resistor R2 is configured to be coupled to a positive input terminal of the load circuit, a second end of the resistor R2 is configured to be coupled to a positive output terminal of the switch-mode power supply, and a third end of the resistor R2 is coupled to a positive input terminal of the first differential amplifier; and
   wherein a first end of the resistor R4 is coupled to the positive input terminal of the first differential amplifier, and a second end of the resistor R4 is coupled to a grounding circuit.

3. The load line circuit according to claim 2, wherein a resistance value of the resistor R1 is the same as a resistance value of the resistor R2, and a resistance value of the resistor R3 is the same as a resistance value of the resistor R4.

4. The load line circuit according to claim 2, wherein a resistance value of the resistor R1, a resistance value of the resistor R2, a resistance value of the resistor R3, and a resistance value of the resistor R4 are the same.

5. The load line circuit according to claim 2, wherein the first sampling circuit further comprises a first capacitor connected to the resistor R3 in parallel.

6. The load line circuit according to claim 2, wherein the first sampling circuit further comprises a second capacitor connected to the resistor R2 in parallel.

7. The load line circuit according to claim 1, wherein the second sampling circuit comprises a resistor R5, a resistor R6, a resistor R7, a resistor R8, and a second differential amplifier, wherein
   a first end of the resistor R5 is configured to be coupled to a first terminal of a sampling resistor, a second end of the resistor R5 is coupled to a negative input terminal of the second differential amplifier, and the first terminal of the sampling resistor is coupled to a positive input terminal of the load circuit;
   wherein a first end of the resistor R6 is coupled to the negative input terminal of the second differential amplifier, and a second end of the resistor R6 is coupled to an output terminal of the second differential amplifier;
   wherein a first of the resistor R7 is configured to be coupled to a second terminal of the sampling resistor, a second end of the resistor R7 is coupled to a positive input terminal of the second differential amplifier, and the second terminal of the sampling resistor is coupled to a positive output terminal of the switch-mode power supply; and
   wherein a first end of the resistor R8 is coupled to the positive input terminal of the second differential amplifier, and a second end of the resistor R8 is coupled to a grounding circuit.

8. The load line circuit according to claim 7, wherein a resistance value of the resistor R5 is the same as a resistance value of the resistor R7, and the resistor R6 and the resistor R8 have a same resistance value.

9. The load line circuit according to claim 7, wherein the second sampling circuit further comprises a resistor R9 and a third capacitor, a first terminal of the resistor R9 is coupled to the resistor R7, and a second terminal of the resistor R9 is coupled to the positive input terminal of the second differential amplifier; and
   wherein a first end of the third capacitor is coupled to the first terminal of the resistor R9, and a second end of the third capacitor is grounded.

10. The load line circuit according to claim 9, wherein a sum of a resistance value of the resistor R9 and a resistance value of the resistor R7 is a resistance value of the resistor R5, and the resistor R6 and the resistor R8 have a same resistance value.

11. The load line circuit according to claim 9, wherein there are N transmission paths connected in parallel between the load circuit and the positive output terminal of the switch-mode power supply, wherein the sampling resistor is located in one of the N transmission paths, wherein N is an integer greater than or equal to 1; and
   wherein a resistance value of the resistor R6 is N times of a resistance value of the resistor R5.

12. The load line circuit according to claim 1, wherein the feedback circuit is configured to:
   perform additive operational amplifying processing on the second voltage and the regulating voltage to generate the feedback voltage.

13. The load line circuit according to claim 12, wherein the feedback circuit comprises a resistor R10, a resistor R11, a resistor R12, a resistor R13, a resistor R14, and a third differential amplifier, wherein
   a first end of the resistor R11 is coupled to the output terminal of the first sampling circuit, a second end of the resistor R11 is coupled to each of one end of the resistor R12 and a positive input terminal of the third differential amplifier, and a third end of the resistor R12 is grounded;
   wherein a first end of the resistor R14 is coupled to the output terminal of the second sampling circuit, and a second end of the resistor R14 is coupled to the positive input terminal of the third differential amplifier;
   wherein a first end of the resistor R13 is grounded, and a second end of the resistor R13 is coupled to a negative input terminal of the third differential amplifier; and
   wherein a first end of the resistor R10 is coupled to the negative input terminal of the third differential amplifier, and a second end of the resistor R10 is coupled to an output terminal of the third differential amplifier.

14. The load line circuit according to claim 13, wherein the feedback circuit further comprises a fourth capacitor, wherein a first end of the fourth capacitor is coupled to the negative input terminal of the third differential amplifier, and a secondend of the fourth capacitor is coupled to the output terminal of the third differential amplifier.

15. The load line circuit according to claim 13, wherein a resistance value of the resistor R11, a resistance value of the resistor R12, and a resistance value of the resistor R14 are the same, and a resistance value of the resistor R10 is twice of a resistance value of the resistor R13.

16. An electronic device, comprising:
   a load line circuit comprising:
      a first sampling circuit configured to generate a second voltage and provide the second voltage to a feedback circuit, wherein a voltage value of the second voltage is linearly and positively correlated with a voltage value of a first voltage, wherein the first voltage is a voltage provided by a switch-mode power supply to a load circuit, and wherein an output terminal of the first sampling circuit is coupled to a first input terminal of the feedback circuit;

a second sampling circuit configured to generate a regulating voltage and provide the regulating voltage to the feedback circuit, wherein a voltage value of the regulating voltage is linearly and positively correlated with a current value of a first current, wherein the first current is a current provided by the switch-mode power supply to the load circuit, and wherein an output terminal of the second sampling circuit is coupled to a second input terminal of the feedback circuit; and the feedback circuit configured to generate a feedback voltage based on the second voltage and the regulating voltage, and feed back the feedback voltage to the switch-mode power supply, wherein a voltage value of the feedback voltage is linearly and positively correlated with each of the voltage value of the second voltage and the voltage value of the regulating voltage, and wherein an output terminal of the feedback circuit is configured to be coupled to the switch-mode power supply;

the load circuit, wherein a negative output terminal of the switch-mode power supply is coupled to a negative input terminal of the load circuit; and a sampling resistor, wherein a positive output terminal of the switch-mode power supply is coupled to a second terminal of the sampling resistor, and wherein a first terminal of the sampling resistor is coupled to a positive input terminal of the load circuit; the first sampling circuit of the load line circuit is coupled to each of the positive input terminal of the load circuit and the negative input terminal of the load circuit, and a second sampling circuit of the load line circuit is coupled to each of the first terminal of the sampling resistor and the second terminal of the sampling resistor; and the switch-mode power supply configured to provide the first voltage and the first current to the load circuit by using the sampling resistor.

17. The electronic device according to claim 16, wherein there are N transmission paths between the positive output terminal of the switch-mode power supply and the positive input terminal of the load circuit, wherein the sampling resistor is located in one of the N transmission paths, and wherein N is an integer greater than or equal to 1.

* * * * *